US011344032B1

(12) United States Patent
Simon et al.

(10) Patent No.: US 11,344,032 B1
(45) Date of Patent: May 31, 2022

(54) PORTABLE BAKING OVEN (71) Applicant: Halo Products Group, LLC, Elizabethtown, KY (US)

(72) Inventors: Paul J. Simon, Elizabethtown, KY (US); Michael R. Giebel, Joplin, MO (US)

(73) Assignee: HALO PRODUCTS GROUP, LLC, Elizabethtown, KY (US)

( * ) Notice: Subject to any disclaimer, the term of this patent is extended or adjusted under 35 U.S.C. 154(b) by 0 days.

(21) Appl. No.: 17/579,171

(22) Filed: Jan. 19, 2022

Related U.S. Application Data (60) Provisional application No. 63/192,013, filed on May 22, 2021.

(51) Int. Cl.
A21B 1/52 (2006.01)
A21B 1/44 (2006.01)
F24C 3/08 (2006.01)
F24C 15/00 (2006.01)
A47J 36/10 (2006.01)
A47J 37/06 (2006.01)
A47J 36/36 (2006.01)
F24C 15/36 (2006.01)
F24C 3/14 (2021.01)
A21B 1/50 (2006.01)
A21B 5/00 (2006.01)

(52) U.S. Cl.
CPC ............... A21B 1/52 (2013.01); A21B 1/44 (2013.01); A21B 1/50 (2013.01); A47J 36/10 (2013.01); A47J 36/36 (2013.01); A47J 37/0652 (2013.01); A47J 37/0658 (2013.01); A47J 37/0664 (2013.01); F24C 3/087 (2013.01); F24C 3/14 (2013.01); F24C 15/007 (2013.01); F24C 15/36 (2013.01); A21B 5/00 (2013.01)

(58) Field of Classification Search
CPC .... A21B 1/52; A21B 1/44; A21B 1/50; A21B 5/00; A47J 37/0658; A47J 37/0652; A47J 37/0664; A47J 37/0647; A47J 36/10; A47J 36/36; F24C 3/14; F24C 3/087; F24C 15/007; F24C 15/36
USPC .................. 126/19 M, 275 R, 20; 99/426
IPC .......... A21B 1/52,1/44, 1/50, 5/00; F24C 3/14; A47J 36/10, 36/36
See application file for complete search history.

(56) References Cited

U.S. PATENT DOCUMENTS 6,187,359 B1 * 2/2001 Zuccarini ............ A47J 37/0786
126/41 R
8,312,872 B2 * 11/2012 Park ........................ F23D 14/02
126/92 AC (Continued)

FOREIGN PATENT DOCUMENTS

CA        2003711 A1 *  6/1990  ............. A21B 1/245
DE   202004006450 U1 *  9/2004  ............... A21B 1/33

(Continued)

Primary Examiner — Steven B McAllister
Assistant Examiner — Daniel E. Namay
(74) Attorney, Agent, or Firm — David R. Yohannan; Yohannan Law (57) ABSTRACT A portable baking oven has an upper portion and a lower portion that define a baking chamber are disclosed. A baking chamber opening may be defined entirely by the oven upper portion. The upper portion may pivot away from the lower portion to allow access to the interior of the oven for cleaning. The oven may include a gas-powered infrared bottom burner and a gas-powered curved back burner.

27 Claims, 11 Drawing Sheets (56) References Cited

U.S. PATENT DOCUMENTS

| | | | | |
|---|---|---|---|---|
| 8,624,166 | B2* | 1/2014 | Moreth, III | F24C 7/06 |
| | | | | 219/386 |
| 9,347,673 | B1* | 5/2016 | Smart | F24C 15/007 |
| 9,491,951 | B2* | 11/2016 | Case | A47J 37/0704 |
| 9,848,731 | B2* | 12/2017 | Dahle | A21D 8/06 |
| 10,105,008 | B2 | 10/2018 | Contarino, Jr. | |
| 10,524,616 | B2 | 1/2020 | Contarino, Jr. | |
| 2008/0156201 | A1* | 7/2008 | Cook | A47J 37/046 |
| | | | | 99/443 R |
| 2010/0193500 | A1* | 8/2010 | Moreth, III | F24C 15/16 |
| | | | | 219/402 |
| 2014/0014086 | A1* | 1/2014 | Case | A47J 37/0759 |
| | | | | 126/19 R |
| 2014/0216434 | A1* | 8/2014 | Moreth, III | F24C 15/025 |
| | | | | 126/92 AC |
| 2014/0238969 | A1* | 8/2014 | Moreth, III | F24C 7/06 |
| | | | | 219/402 |
| 2014/0287119 | A1* | 9/2014 | Dahle | A47J 37/0727 |
| | | | | 426/520 |
| 2016/0095472 | A1* | 4/2016 | Dahle | A21B 1/44 |
| | | | | 99/447 |
| 2017/0055770 | A1* | 3/2017 | Case | A21B 1/00 |
| 2019/0231123 | A1* | 8/2019 | Borovicka | A47J 37/0718 |
| 2020/0015484 | A1* | 1/2020 | Hegarty | F24C 15/14 |
| 2020/0345176 | A1* | 11/2020 | Bert | F23Q 13/02 |
| 2021/0161151 | A1* | 6/2021 | Thorogood | F24C 15/027 |

FOREIGN PATENT DOCUMENTS

| | | | | |
|---|---|---|---|---|
| DE | 202020105677 U1 * | 11/2020 | | A47J 37/0658 |
| HU | T68316 A * | 6/1995 | | A47J 37/0623 |

* cited by examiner

PORTABLE BAKING OVEN

FIELD OF THE INVENTION

Embodiments of the present invention relate to food cooking appliances.

BACKGROUND OF THE INVENTION

Outdoor cooking has become very popular, and accordingly the need for portable appliances to facilitate outdoor cooking has increased. As part of this trend, a desire has developed to practice all forms of cooking outdoors, including baking. A number of different appliances are currently available to bake food, particularly pizza, outdoors. In order to bake or cook pizza, the baking chamber is preferably very hot and traditionally the best pizza ovens have been constructed of brick which enables the baking chamber to be maintained at very high temperatures. Cooking temperatures above 400 F degrees are normally required, and preferable cooking temperatures may range as high as 700 F-900 F degrees or even higher. Furthermore, it is preferable to cook pizza on a stone or stone-like surface because the stone efficiently conducts and holds heat, which may keep the oven temperature steady even when a cold ingredient (such as an uncooked pizza) is introduced. A stone cooking surface not only helps the pizza cook more evenly, but also allows the bottom to get crisp. A crisp outer crust is considered essential for a quality pizza.

Cooking appliances require some form of power and/or fuel to generate the heat required for cooking. With respect to outdoor ovens in particular, it may be difficult to provide sufficient power to generate the high temperatures desired to cook pizza. Power may also be needed to rotate a pizza stone relative to a heat source when using a compact portable outdoor oven to cook pizza. However, in order to be truly portable, an oven should not rely solely on alternating current (AC) as a power source. Conversely, the power requirement of traditional gas heating elements capable of generating the desired temperatures for cooking pizza may require relatively large supplies of gas fuel, e.g., twenty-pound propane cylinders. Further, non-electric heating elements, such as conventional propane burners, may be prone to uneven heating and poor reheating characteristics when tasked with heating a series of cold items, one after the other. As a result of these challenges, manufacturers have struggled to provide an affordable and truly portable oven for cooking pizza that is able to generate and maintain the desired cooking temperatures. Manufacturers have also found it difficult to provide an affordable and compact portable oven for cooking pizza that distributes heat in a manner that produces a crisp outer crust without burning portions of the pizza.

In light of the foregoing challenges, there is a need for an affordable portable pizza oven that is untethered to a continuous supply of AC electrical power. Portable ovens including an onboard replaceable or rechargeable battery pack are needed to provide nearly unlimited portability.

There is a need also for a portable pizza oven that is relatively light, compact, and capable of being used safely on a table top surface. In particular, there is a need for a compact oven that is still capable of cooking a pizza approximately sixteen (16) inches in diameter to provide sufficient amounts of food for several people at a time.

There is a need also for a portable pizza oven that is able to generate and sustain the high temperatures required for cooking pizza. A preferred oven should be able to maintain required cooking temperatures while cooking a series of pizzas. As such, a preferred portable pizza oven should be capable of more quickly rebounding to a desired cooking temperature when tasked with heating a series of cold items, one after the other. As a result of maintenance of high temperatures, cooking times preferably may be under ten (10) minutes, more preferably under seven (7) minutes, and even more preferably about five (5) minutes.

There is a need also for a portable pizza oven that improves the ease with which a pizza may be quickly and evenly cooked to have a crisp outer crust without burning. In particular, there is a need for an oven that applies heat in a manner that crisps all portions of the crust evenly, including the very center of the pizza and the outer edge.

There is a need also for a portable pizza oven that is esthetically pleasing and mimics the look and feel of a traditional brick oven. In particular, because pizza ovens must be maintained at such a high temperature, there is a need for an oven that can quickly acquire cooking temperature and maintain it without requiring the user to open and close a baking chamber door which would necessarily be very hot to the touch.

There is a need also for a portable pizza oven that is designed to be used safely outdoors without generating excessively high outer surface temperatures.

There is a need also for a portable pizza oven that efficiently manages the collection of grease or other food particles that fall from the pizza during cooking or during the process of placing the pizza in, and removing the pizza from, the oven. Still further, there is a need for a portable pizza oven that is easily cleaned after use.

OBJECTS OF THE INVENTION

Accordingly, it is an object of some, but not necessarily all embodiments of the present invention to provide an affordable portable pizza oven that is untethered to a continuous supply of AC electrical power. Some embodiments of the present invention may include an onboard battery pack capable of powering a rotary motor for an extended cooking session lasting one or several hours without the need for recharge.

It is also an object of some but not necessarily all embodiments of the present invention to provide a portable pizza oven that is relatively light, compact, and capable of being used safely on a table top surface. Some embodiments of the invention may be capable of using one pound propane gas cylinders for a full cooking session of up to one hour thereby greatly reducing the overall weight and bulk of the combined oven and fuel supply.

It is also an object of some but not necessarily all embodiments of the present invention to provide a portable pizza oven that is able to generate and sustain the high temperatures required for cooking pizza. In this regard, some embodiments of the invention may utilize a gas-powered infrared bottom burner that is capable of efficiently generating very even and high temperatures.

It is also an object of some but not necessarily all embodiments of the present invention to provide a portable pizza oven that improves the ease with which a pizza may be quickly and evenly cooked to have a crisp outer crust without burning. In this regard, some embodiments may use the combination of an infrared bottom burner and a curved back burner with a reflector to cook both inner and outer crust portions to reach a finished state simultaneously.

It is also an object of some but not necessarily all embodiments of the present invention to provide a portable pizza oven that is esthetically pleasing and mimics the look and feel of a traditional brick oven.

It is also an object of some but not necessarily all embodiments of the present invention to provide a portable pizza oven that is designed to be used safely outdoors without generating excessively high outer surface temperatures. At the same time, some but not all embodiments of the present invention may be easily cleaned. To achieve this goal, some embodiments may include a housing including an upper portion that pivots away from a lower portion to allow access to the interior of the oven for cleaning. In particular, the pivoting action may permit a user to remove a drip tray heat shield for cleaning.

It is another object of some, but not necessarily all embodiments of the present invention to provide a portable pizza oven that is capable of more quickly rebounding to a desired cooking temperature when tasked with heating a series of cold items, one after the other. To achieve this goal, some embodiments of the present invention may include the aforenoted gas-powered infrared bottom burner.

SUMMARY OF EMBODIMENTS OF THE INVENTION

Responsive to the foregoing challenges, Applicant has developed an innovative portable baking oven having one or more of the features described in the detailed description.

Applicant has further developed an innovative oven comprising: a housing defining a baking chamber and a baking chamber opening, said baking chamber opening having a width dimension and a height dimension, wherein the width dimension is greater than the height dimension, and wherein said baking chamber opening is of sufficient size to allow a baking item to pass therethrough; a circular metal pan disposed within the baking chamber, said metal pan having a plurality of openings provided about a central axis wherein said central axis extends in a direction that is substantially parallel to the height dimension of the baking chamber opening; a baking stone supported by said metal pan; a gas-powered infrared burner disposed within the baking chamber below the circular metal pan; and a motor operatively connected to the circular metal pan, said motor adapted to rotate the circular metal pan about the central axis.

Applicant has further developed an innovative oven comprising: a housing defining a baking chamber and a baking chamber opening, wherein said baking chamber opening has a width dimension and a height dimension, wherein the width dimension is greater than the height dimension, wherein the housing includes an upper portion, a lower portion, wherein said baking chamber opening is entirely defined by said upper portion, and wherein said baking chamber opening is of sufficient size to allow a baking item to pass therethrough; at least one hinge connecting the upper portion to the lower portion, wherein said at least one hinge is adapted to permit the upper portion to pivot away from the lower portion, and wherein said at least one hinge includes a biasing element adapted to maintain the upper portion in a pivoted away position relative to the lower portion; a circular metal pan disposed within the baking chamber, said metal pan having a plurality of openings provided about a central axis, wherein said central axis extends in a direction that is substantially parallel to the height dimension of the baking chamber opening; a baking stone supported by said metal pan; a gas-powered infrared burner disposed within the baking chamber below the circular metal pan, said infrared burner including an emitter entirely disposed between the central axis and a side wall of the housing; a motor operatively connected to the circular metal pan, said motor adapted to rotate the circular metal pan about the central axis; a removeable heat shield disposed in the baking chamber between the metal pan and the emitter, said heat shield having an opening sized to expose at least a majority of the emitter to the metal pan; and a gas-powered curved back burner disposed within the baking chamber above and behind the circular metal pan relative to the baking chamber opening.

Applicant has still further developed an innovative oven comprising: a housing defining a baking chamber and a baking chamber opening, wherein said baking chamber opening has a width dimension and a height dimension, wherein the width dimension is greater than the height dimension, wherein the housing includes an upper portion and a lower portion, wherein said baking chamber opening is entirely defined by said upper portion, and wherein said baking chamber opening is of sufficient size to allow a baking item to pass therethrough; at least one hinge is adapted to permit the upper portion to pivot away from the lower portion and wherein said baking chamber opening is of sufficient size to allow a baking item to pass therethrough when the upper portion is fully pivoted toward the lower portion; a circular metal pan disposed within the baking chamber, said metal pan having a plurality of openings provided about a central axis; a baking stone supported by said metal pan; a gas-powered bottom burner disposed within the baking chamber below the circular metal pan; a motor operatively connected to the circular metal pan, said motor adapted to rotate the circular metal pan about the central axis; and a heat shield disposed in the baking chamber between the metal pan and the emitter, said heat shield having an opening sized to expose the gas-powered bottom burner to the metal pan.

It is to be understood that both the foregoing general description and the following detailed description are exemplary and explanatory only and are not restrictive of the invention as claimed.

BRIEF DESCRIPTION OF THE DRAWINGS

In order to assist the understanding of this invention, reference will now be made to the appended drawings, in which like reference characters refer to like elements. The drawings are exemplary only and should not be construed as limiting the invention.

DETAILED DESCRIPTION OF EMBODIMENTS OF THE INVENTION

Reference will now be made in detail to embodiments of the present invention, examples of which are illustrated in the accompanying drawings. With reference to FIGS. 1, 2, 3 and 11, the outer surface of a portable or tabletop oven 10 may include an oven housing including a lower portion 100 and an upper portion 101 preferably constructed largely or entirely of stainless steel and/or other formed metal(s). The housing lower portion 100 may be supported on an underside by two or more spaced feet 102. Each foot 102 may be constructed of formed metal and include upward extending elements connected to the oven housing lower portion 100. The underside 112 of the oven housing lower portion 100 may include one or more openings provided adjacent to each foot 102 (not shown in these figures) to serve as heat vents. A housing topside 114 may be gently curved or bowed from side-to-side with a central peak. The topside 114 may support a temperature indicator 116 near (as shown) or on an upper front lip 124 portion of the housing (e.g., see FIG. 2). The rear wall 108 of the oven housing may include one or more openings to serve as heat vents 152.

A lower front lip 122 may be integral with and extend outward from the housing upper portion 101. The lower front lip 122 may extend a predetermined distance, preferably in the range of 0.5 to 1.5 inches, and more preferably about 0.75 inches, beyond the outer edge of the upper front lip 124 of the housing upper portion 101. The lower front lip 122 and the upper front lip 124 may frame and define the upper and lower boundaries of a baking chamber opening 118. The baking chamber opening 118 may have a width dimension that is greater than its height dimension. The baking chamber opening 118 may also be of sufficient size to easily allow a baking item, such as a pizza, to pass therethrough into the baking chamber (i.e., the interior of the housing upper portion 101 and lower portion 100. A baking stone 140, discussed in more detail below, may be provided within the baking chamber.

The front face 110, the lower front lip 122, and the upper front lip 124, may be gently curved or bowed from side-to-side in a complimentary fashion with a central peak. A control knob 120 and an ignitor button 121 may be provided below the lower front lip 122 on the front face 110 of the housing lower portion 100. A fuel connection hose 150 may extend from the right side of the housing lower portion 100. The fuel connection hose 150 may be coupled to a one pound gas canister connector 154 and a twenty pound gas canister connector 156. An AC electric power/recharger receptacle may be provided on the left side of the lower housing 100. The receptacle may be connected to a battery pack (not shown) provided within the lower housing 100.

Figure 2:
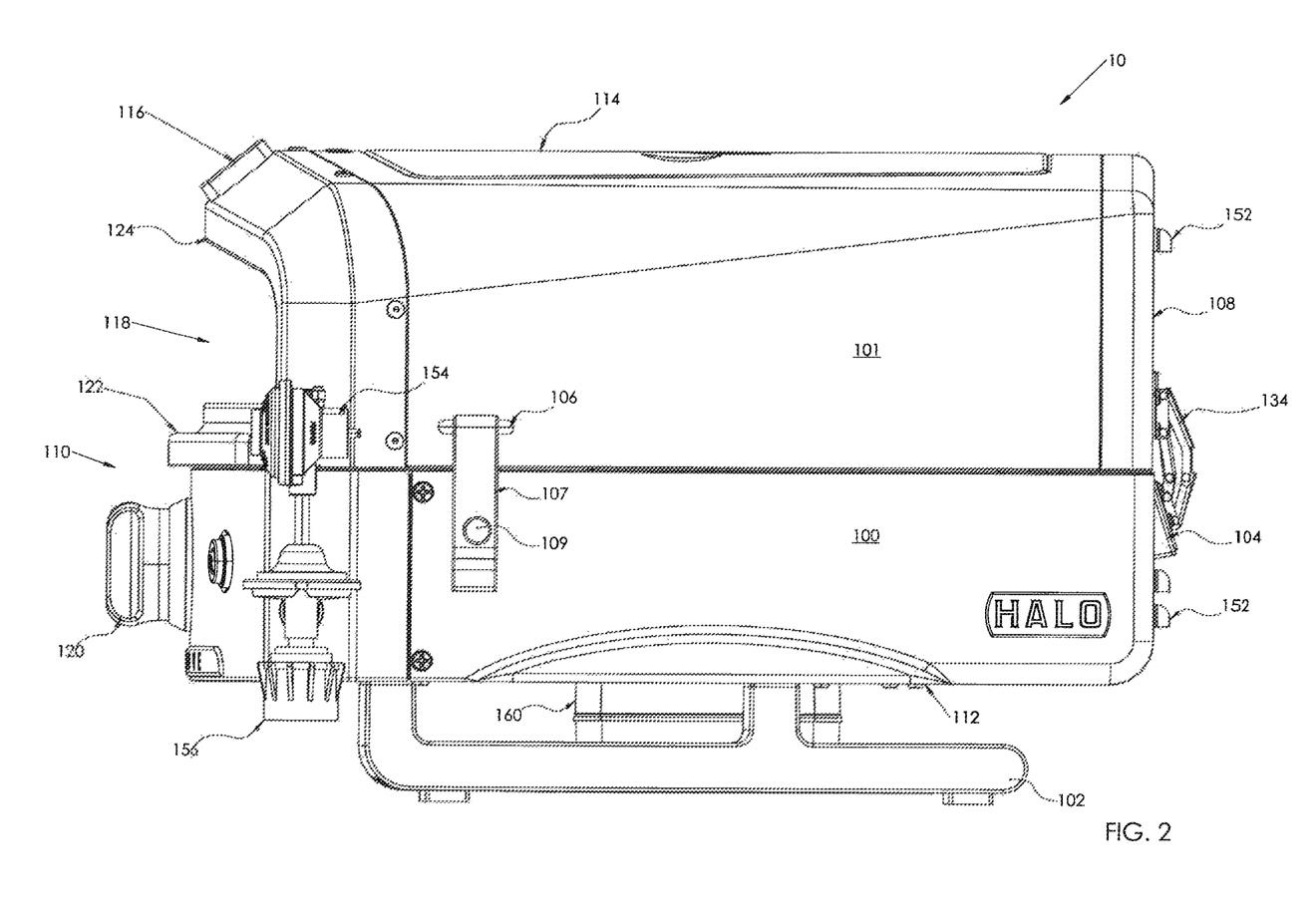
FIG. 2 is a side view of a portable oven shown with upper and lower portions in a collapsed, locked, or cooking position in accordance with embodiments of the invention.
Figure 3:
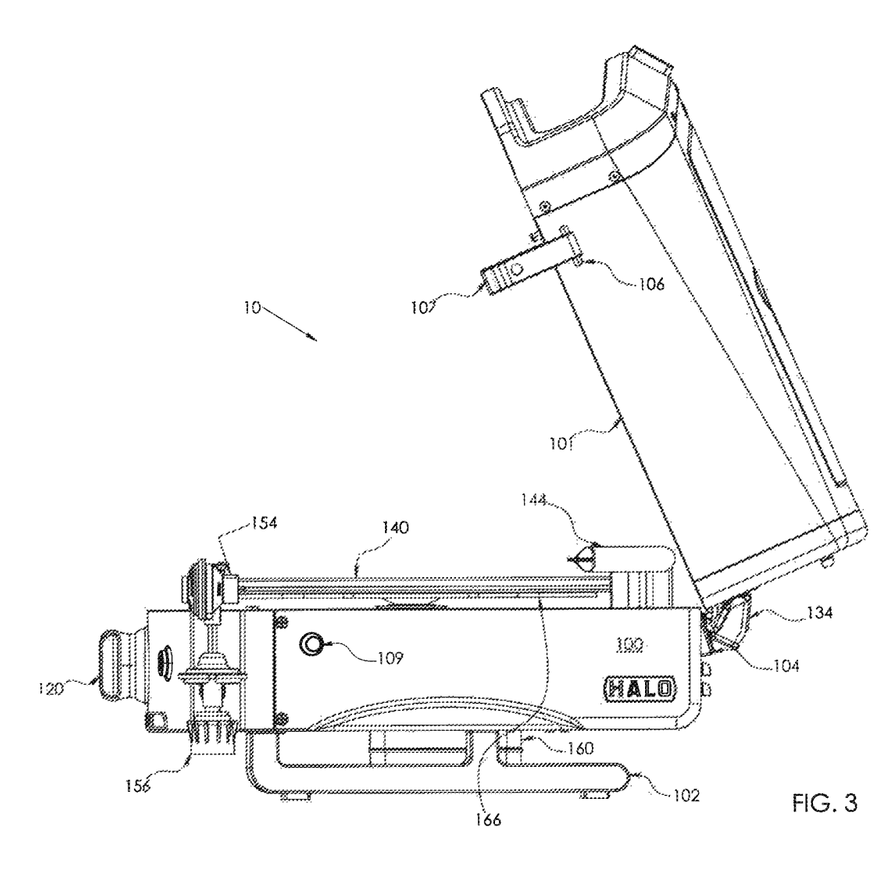
FIG. 3 is a side view of a portable oven shown with upper and lower portions in an open, unlocked, or cleaning position in accordance with embodiments of the invention.
Figure 4:
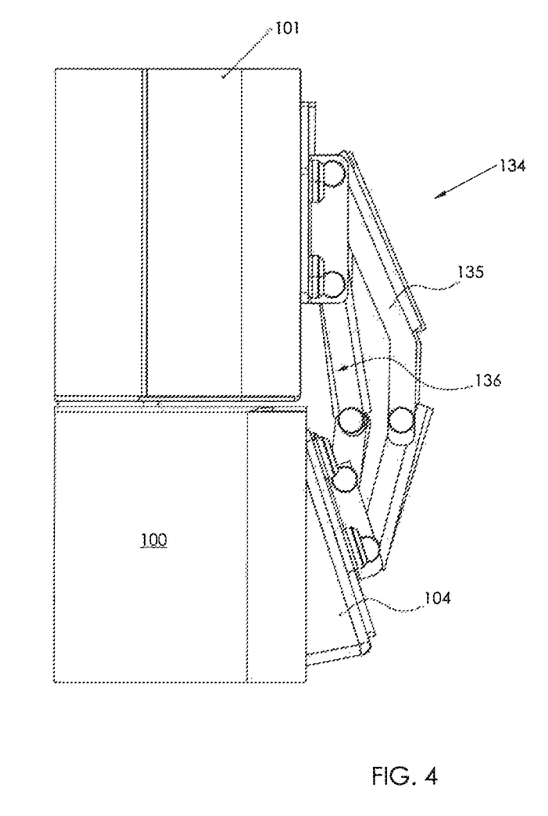
FIG. 4 is a side view of a portable oven hinge that connects upper and lower portions of the oven.
Figure 5:
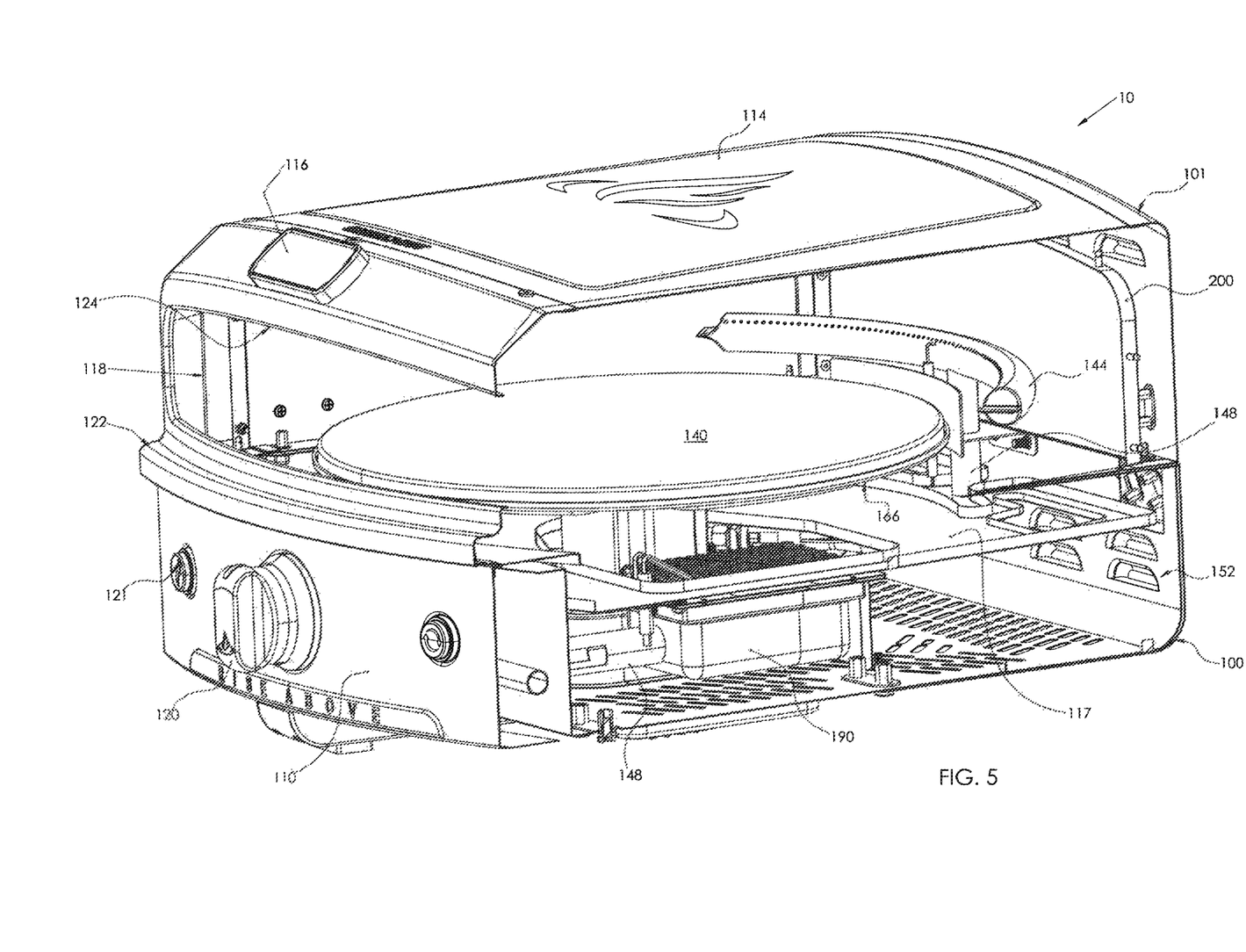
FIG. 5 is front perspective cross-sectional view of a portable oven in accordance with embodiments of the invention.
Figure 6:
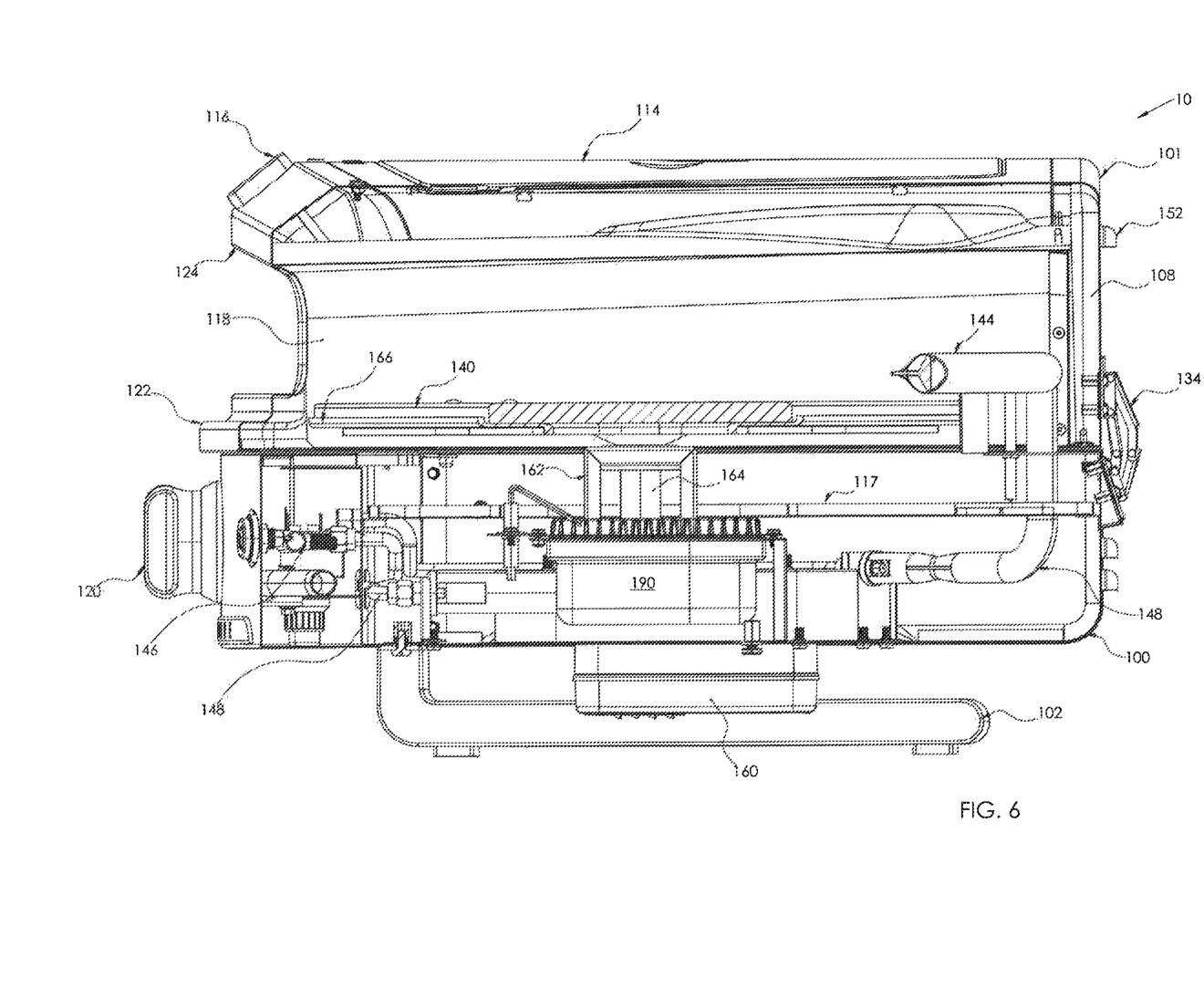
FIG. 6 is a side cross-sectional view of a portable oven in accordance with embodiments of the invention.
Figure 7:
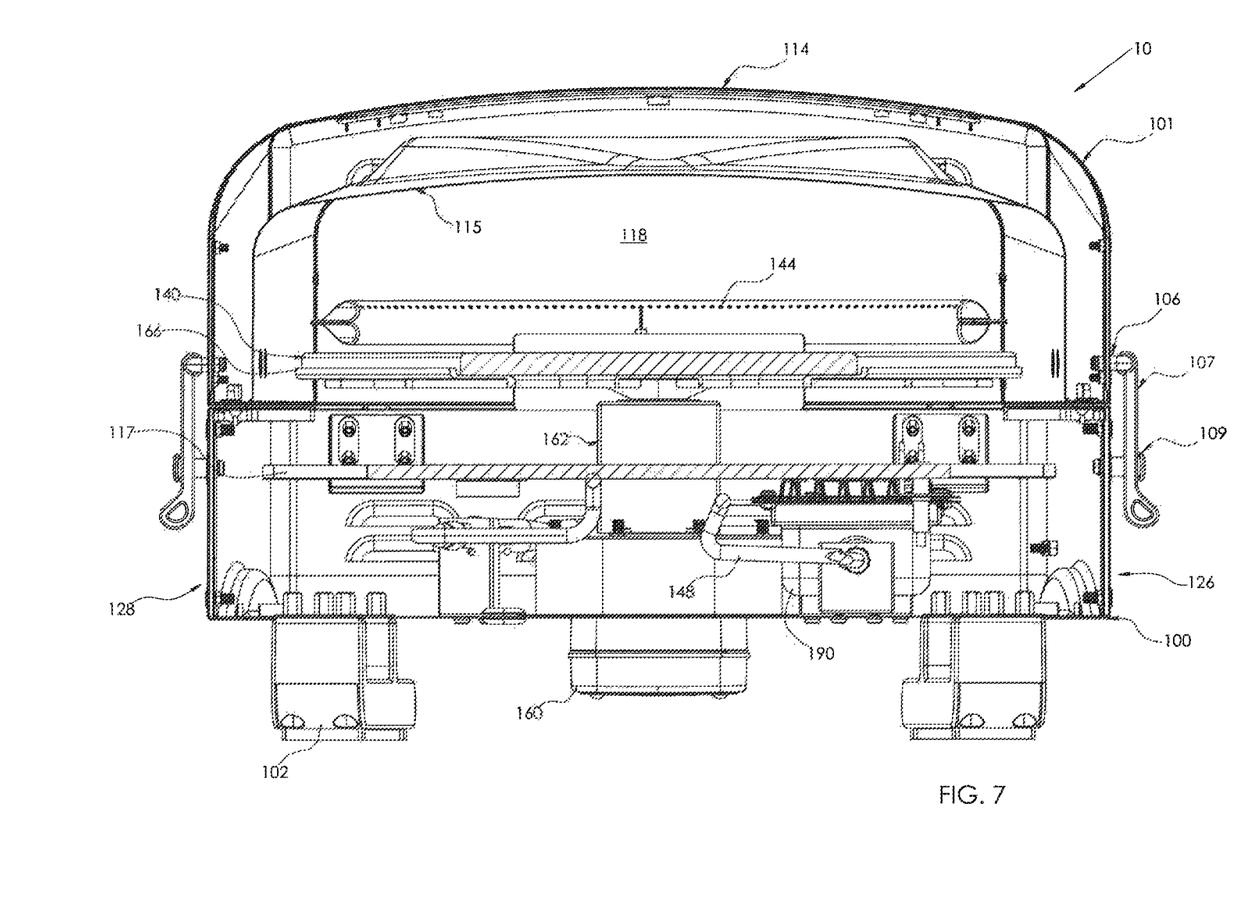
FIG. 7 is a front cross-sectional view of a portable oven in accordance with embodiments of the invention.
Figure 8:
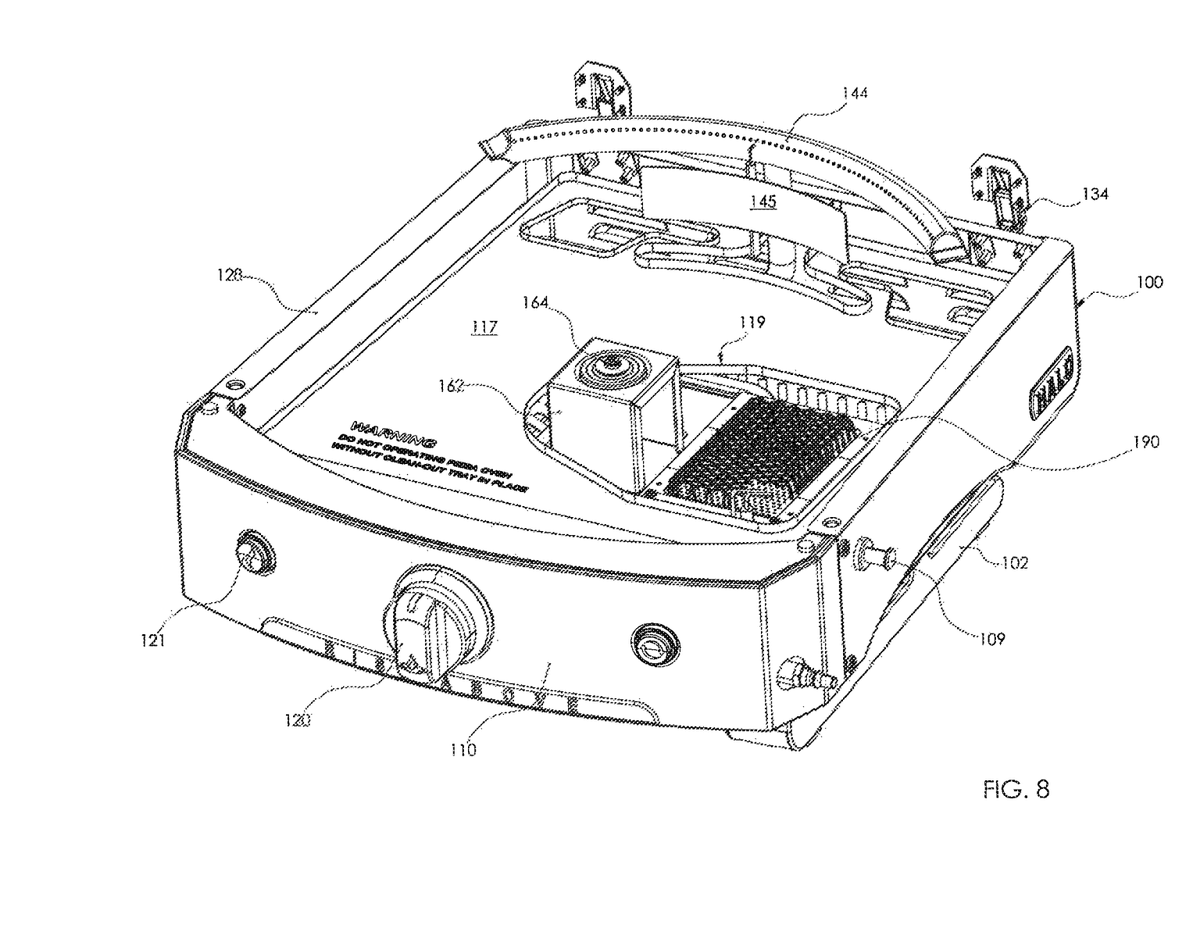
FIG. 8 is a top perspective view of a lower portion of a portable oven in accordance with embodiments of the invention.
Figure 9:
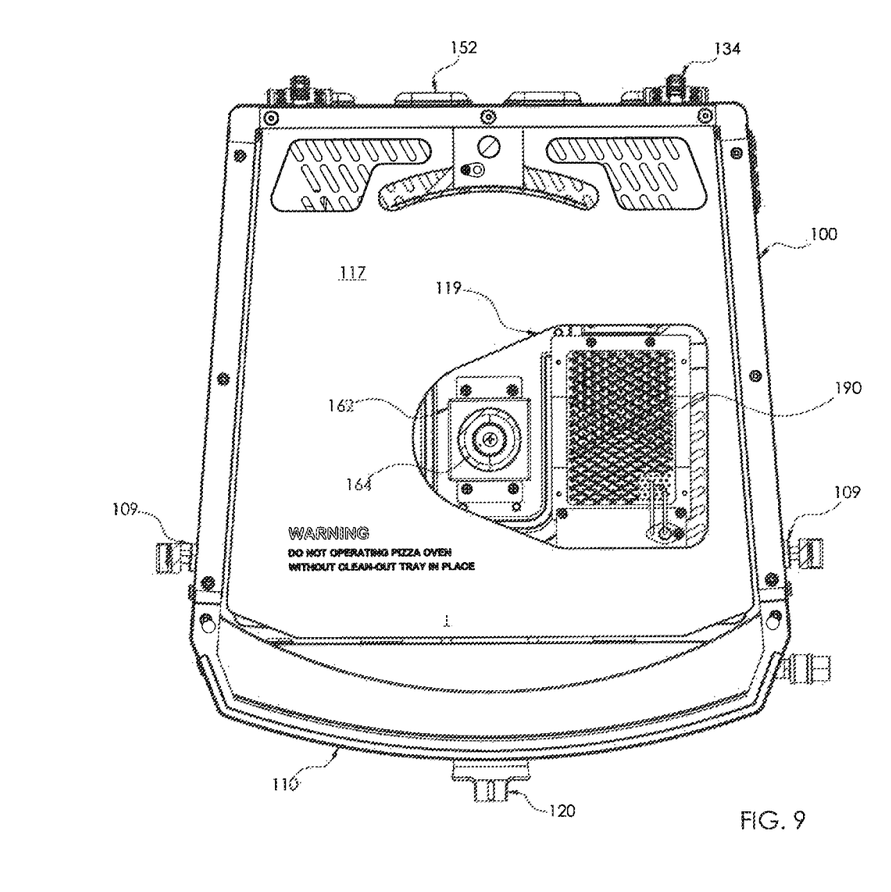
FIG. 9 is a top view of a lower portion of a portable oven with the rotatable metal pan removed in accordance with embodiments of the invention.

With reference to FIGS. 2 and 4, the housing lower portion 100 and the housing upper portion 101 may be connected together with one or more hinges 134. In a preferred embodiment, two hinges 134 are employed. The housing lower portion 100 may include a hinge pedestal 104 for each hinge 134. Each hinge pedestal 104 may include a canted outer surface. The canted surface may differ from the vertical orientation of the rear wall 108 of the lower portion 100 by between 5-45 degrees. Each hinge 134 may include a guide strut 135 and a bias strut 136. With reference to FIG. 3, the hinges 134 may permit the housing upper portion 101 to pivot away from the housing lower portion 101. The bias struts 135 may be adapted to maintain the housing upper portion 101 in a pivoted away position relative to the housing lower portion 100. One or more bushings may be provided along the mating side edges of either or both of the lower portion 100 and the upper portion 101 to provide a cushion between the two portions when they are closed towards one another.

Figure 1:
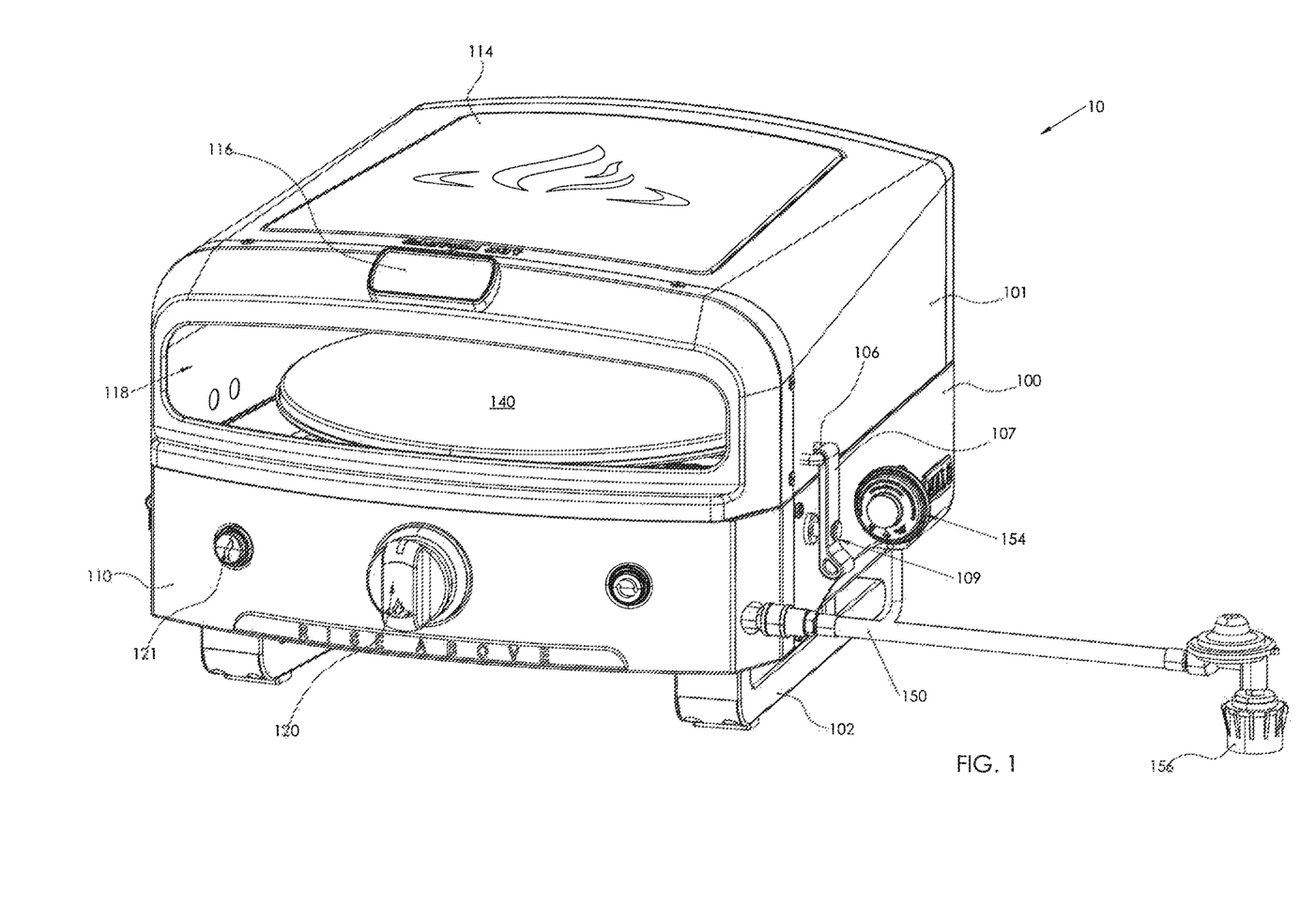
FIG. 1 is a right front perspective view a portable oven in accordance with embodiments of the invention.
Figure 11:
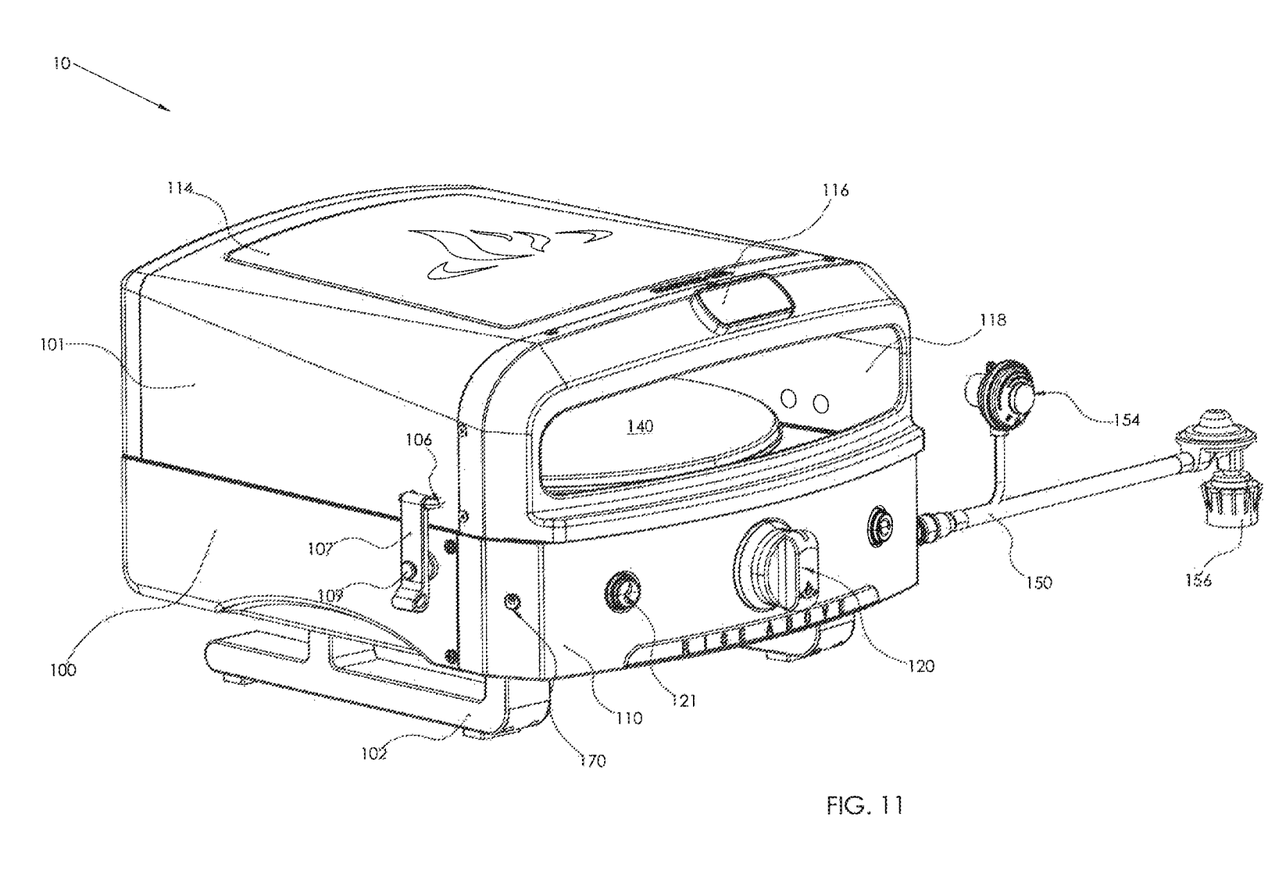
FIG. 11 is a left front perspective view a portable oven in accordance with embodiments of the invention.

With renewed reference to FIGS. 1-4 and 11, the forward left and right sides of the upper portion 101 each may have a U-shaped lid strap mount 106 fastened thereto. The forward left and right sides of the lower portion 100 each may have a lid strap catch 109 extending away from the lower portion directly below the lid strap mounts 106. A flexible lid strap 107 may be permanently connected to each of the lid strap mounts 106. Each lid strap 107 may include an opening adapted to receive and removably connect to a corresponding lid strap catch 109. The lid straps 107 may be constructed of stretchable material that may be pulled down and over the lid strap catches 109 so that when the upper portion 101 and the lower portion 100 are in a collapsed position (as shown in FIGS. 1, 2 and 11), the upper portion and lower portion are held securely together in a clamshell fashion.

With reference to FIGS. 5, 6, 7, 8, 9 and 10 in which like reference characters refer to like elements discussed above, the housing lower portion 100 may include one or more gas-powered infrared burners 190 disposed within the housing lower portion 100 below an opening 119 provided in the heat shield 117. The infrared burner 190 may include an emitter entirely disposed between a central axis of the oven 10 and a side wall, such as the right side wall 126 for example, of the housing lower portion 100. A back burner 144 may be provided above the heat shield 117 between the baking stone 140 and the rear wall 108. The infrared burner 190 and the back burner 144 may be configured to disperse and burn propane gas, natural gas, or the like. The back burner 144 preferably may have a gently curved shape when viewed from above that is complimentary to the curved shape of the baking stone 140. Alternatively, the back burner 144 may have, and/or include, some other shape, such as a linear shape. The back burner 144 may be positioned relative to the baking stone 140 to provide a flame backdrop when viewed from the front face 110.

The housing lower portion 100 may also include a motor recess that is sized and shaped to accommodate a rotary motor 160 centrally located in the lower portion. One or more motor connectors, such as a metal frame 162 for example, may secure the rotary motor 160 to the housing lower portion 100 within the motor recess. The motor connectors 162 may be configured to space the rotary motor 160 from the burner elements in the baking chamber 100 so that a layer of cooling air is maintained between the rotary motor and the burners. The rotary motor 160 preferably may be driven directly or geared to rotate a drive shaft 164 that is connected to a circular metal pan 166 supporting the baking stone 140. The drive shaft 164 may define the central axis for the baking oven 10. The rotary motor 160 may rotate the metal pan 166 and baking stone 140 at a speed predetermined to provide optimal baking for a pizza.

Figure 10:
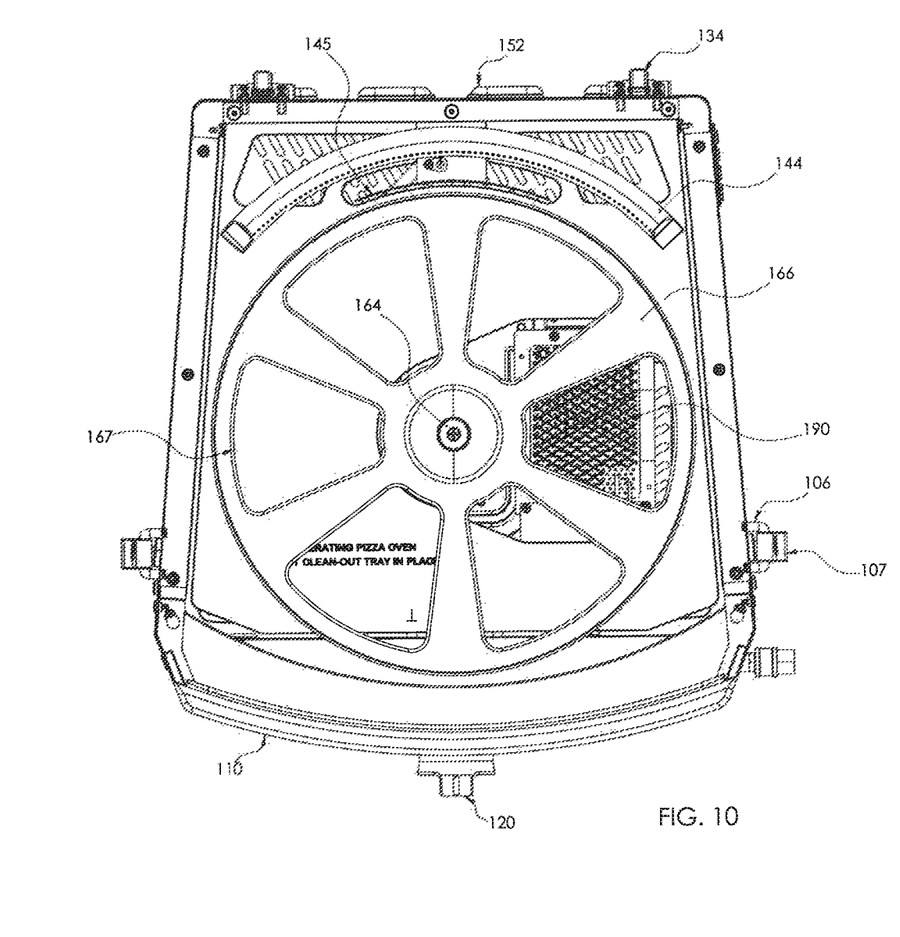
FIG. 10 is a top view of a lower portion of a portable oven with the rotatable metal pan installed in accordance with embodiments of the invention.

The circular metal pan 166 may include an outer upward extending lip adapted to securely hold the baking stone 140, and a plurality of generally trapezoidal shaped openings 167 formed in the metal pan central planar surface. With reference to FIG. 10, an exemplary metal pan 166 may include six (6) pan openings 167. The infrared burner 190 emitter may be disposed within the housing lower portion 100 below the opening 119 provided in the heat shield 117 such that the opening 119 registers with trapezoidal openings 167 provided in the metal pan 166 as it rotates to allow the infrared heat to be directly applied to the baking stone 140. The number and size of the pan openings 167 may be such that when the metal pan 166 is rotated at a constant speed, the infrared burner 190 emitter disposed below the metal pan is exposed to the baking stone 140 supported by the metal pan more than half of the time that the motor 160 is rotating the metal pan.

The baking stone 140 may be disposed generally centrally between the rear wall 108, the lower front lip 122, the right side wall 126, and the left side wall 128 of the oven 10. The baking stone 140 may be provided in the open space above the removable tray or heat shield 117. Preferably the baking stone 140 may have a diameter of about 16 inches. Preferably the baking chamber volume (i.e., the space between the heat shield 117, the baking chamber opening 118, and an inner liner) is sufficient to permit items having a greater vertical dimension than that of a pizza to be cooked within it. The heat shield 117 may include an upper peripheral lip extending upward and away from a central surface of the heat shield that assists in the efficient collection of food droppings on an upper surface of the heat shield and which may be removed for cleaning.

The oven 10 may further include an inner back wall 200, providing some heat shielding function interposed between the back burner 144 and the rear wall 108. Further, one or more portions of the housing upper portion 101 may include an inner liner 115 that provides some heat shielding function for the outer surface of the oven 10. A shiny gently curved heat reflector 145 may disposed within the baking chamber between the curved back burner 144 and the baking stone 140.

The infrared burner 190 and the back burner 144 may be connected to a common gas manifold 148, which in turn may be connected to a single unit, dual gas valve/regulator 146. Both burners 144 and 190 may operate off of one valve 146 with dual outlets for convenience and reduction of manufacturing cost. The control knob 120 may be used to control the dual gas valve/regulator 146. The fuel connection hose 150 may connect to the dual gas valve/regulator 146. An ignitor 121 for the back burner 144 and the one or more infrared burners 190 may be disposed on the front face 110 of the housing lower portion 100. The combined output of the back burner 144 and the infrared burner 190 may be between 18,000 to 25,000 BTU/hour, and more preferably between 20,000 to 24,000 BTU/hour. A back burner 144 output in the range of 10,000 to 13,000 BTU/hour and an infrared burner 190 output of in the range of 8,000 to 11,000 BTU/hour is preferred. Both burners may share a common low pressure dual gas valve/regulator 146 (i.e., a regulator operating at or about ½ PSI) as compared to a high pressure regulator that provides from 1 PSI to 10 PSI. The low pressure regulator 146 may enable the portable oven 10 to operate for a sustained period (up to or exceeding 60 minutes) using a one-pound (1 lb) propane gas cylinder. The infrared burner 190 preferably may radiate heat directly upward towards the baking stone 140. The back burner 144 preferably has gas openings on the top, more preferably on the top side closer in proximity to the baking stone 140 than to the rear wall 108. The infrared burner 190, in conjunction with the rotating baking stone 140, may heat the bottom of the baking stone evenly while the back burner 144 heats the upper part of the baking chamber to cook the top of a pizza at the same time.

The oven may further include a DC battery or battery system contained within the housing lower portion 100 used to power the rotary motor 160. It is appreciated that the battery system could be located anywhere within the oven 10, or even located outside of the oven without departing from the intended scope of the invention. An AC connection to the DC battery system may be provided in some embodiments to permit recharging of the battery system.

As will be understood by those skilled in the art, the invention may be embodied in other specific forms without departing from the spirit or essential characteristics thereof. The elements described above are provided as illustrative examples for implementing the invention. One skilled in the art will recognize that many other implementations are possible without departing from the present invention as recited in the claims. For example, the shapes and sizes of various elements of the embodiments of the invention may be changed without departing from the intended scope of the invention. Accordingly, the disclosure of the present invention is intended to be illustrative, but not limiting, of the scope of the invention. It is intended that the present invention cover all such modifications and variations of the invention, provided they come within the scope of the appended claims and their equivalents.

What we claim is:

1. An oven comprising:
   a housing defining a baking chamber and a baking chamber opening, said baking chamber opening having a width dimension and a height dimension, wherein the housing comprises an upper portion defining an entirety of the baking chamber opening, a lower portion, and at least one hinge connecting the upper portion to the lower portion, said at least one hinge adapted to permit the upper portion to pivot away from the lower portion, wherein the width dimension is greater than the height dimension, and wherein said baking chamber opening is of sufficient size to allow a baking item to pass therethrough;
   a circular metal pan disposed within the baking chamber, said metal pan having a plurality of openings provided about a central axis wherein said central axis extends in a direction that is substantially parallel to the height dimension of the baking chamber opening;
   a baking stone supported by said metal pan;
   a gas-powered infrared burner disposed within the baking chamber below the circular metal pan; and
   a motor operatively connected to the circular metal pan, said motor adapted to rotate the circular metal pan about the central axis.

2. The oven of claim 1 wherein the infrared burner includes an emitter entirely disposed between the central axis and a side wall of the housing, and
   wherein the emitter is exposed to the baking stone through the plurality of openings in the metal pan more than half of the time that the motor is adapted to rotate the circular metal pan about the central axis.

3. The oven of claim 2 further comprising a removeable heat shield disposed in the baking chamber between the metal pan and the emitter, said heat shield having an opening sized to expose at least a majority of the emitter to the metal pan, and said heat shield having an upper peripheral lip extending upward and away from a central surface of the heat shield.

4. The oven of claim 1 wherein the at least one hinge includes a biasing element adapted to maintain the upper portion in a pivoted away position relative to the lower portion.

5. The oven of claim 4 further comprising:
a lid strap mount provided on the upper portion or the lower portion;
a lid strap connected to the lid strap mount; and
a lid strap catch provided on the upper portion or the lower portion, said lid strap catch adapted to connect to and disconnect from the lid strap.

6. The oven of claim 1 further comprising a removeable heat shield disposed in the baking chamber between the metal pan and the infrared burner, said heat shield having an upper peripheral lip extending upward and away from a central surface of the heat shield.

7. The oven of claim 1 wherein the at least one hinge includes a biasing element adapted to maintain the upper portion in a pivoted away position relative to the lower portion.

8. The oven of claim 1 wherein said at least one hinge includes a hinge guide strut and a hinge bias strut.

9. The oven of claim 1 further comprising:
a lid strap mount provided on the upper portion or the lower portion;
a lid strap connected to the lid strap mount; and
a lid strap catch provided on the upper portion or the lower portion, said lid strap catch adapted to connect to and disconnect from the lid strap.

10. The oven of claim 1 further comprising a gas-powered curved back burner disposed within the baking chamber above and behind the circular metal pan relative to the baking chamber opening.

11. The oven of claim 10 further comprising a curved heat reflector disposed within the baking chamber between the curved back burner and the circular metal pan.

12. The oven of claim 1 further comprising a single gas valve connected to both the gas-powered infrared burner and the gas-powered back burner.

13. The oven of claim 1 wherein the infrared burner is adapted to provide in the range of 8000 to 11000 BTU/hour heat output for cooking, and
wherein the back burner is adapted to provide in the range of 10000 to 13000 BTU/hour heat output for cooking.

14. The oven of claim 1 further comprising:
a gas connector for one-pound gas canisters connected to the oven; and
a gas connector for twenty-pound gas canisters connected to the oven.

15. An oven comprising:
a housing defining a baking chamber and a baking chamber opening, wherein said baking chamber opening has a width dimension and a height dimension, wherein the width dimension is greater than the height dimension, wherein the housing includes an upper portion and a lower portion, wherein said baking chamber opening is entirely defined by said upper portion, and wherein said baking chamber opening is of sufficient size to allow a baking item to pass therethrough;
at least one hinge connecting the upper portion to the lower portion, wherein said at least one hinge is adapted to permit the upper portion to pivot away from the lower portion, and wherein said at least one hinge includes a biasing element adapted to maintain the upper portion in a pivoted away position relative to the lower portion;
a circular metal pan disposed within the baking chamber, said metal pan having a plurality of openings provided about a central axis, wherein said central axis extends in a direction that is substantially parallel to the height dimension of the baking chamber opening;
a baking stone supported by said metal pan;
a gas-powered infrared burner disposed within the baking chamber below the circular metal pan, said infrared burner including an emitter entirely disposed between the central axis and a side wall of the housing;
a motor operatively connected to the circular metal pan, said motor adapted to rotate the circular metal pan about the central axis;
a removeable heat shield disposed in the baking chamber between the metal pan and the emitter, said heat shield having an opening sized to expose at least a majority of the emitter to the metal pan; and
a gas-powered curved back burner disposed within the baking chamber above and behind the circular metal pan relative to the baking chamber opening.

16. An oven comprising:
a housing defining a baking chamber and a baking chamber opening, wherein said baking chamber opening has a width dimension and a height dimension, wherein the width dimension is greater than the height dimension, wherein the housing includes an upper portion and a lower portion, wherein said baking chamber opening is entirely defined by said upper portion, and wherein said baking chamber opening is of sufficient size to allow a baking item to pass therethrough;
at least one hinge is adapted to permit the upper portion to pivot away from the lower portion and wherein said baking chamber opening is of sufficient size to allow a baking item to pass therethrough when the upper portion is fully pivoted toward the lower portion;
a circular metal pan disposed within the baking chamber, said metal pan having a plurality of openings provided about a central axis;
a baking stone supported by said metal pan;
a gas-powered bottom burner disposed within the baking chamber below the circular metal pan;
a motor operatively connected to the circular metal pan, said motor adapted to rotate the circular metal pan about the central axis; and
a heat shield disposed in the baking chamber between the metal pan and the emitter, said heat shield having an opening sized to expose the gas-powered bottom burner to the metal pan.

17. The oven of claim 16 wherein said at least one hinge includes a biasing element adapted to maintain the upper portion in a pivoted away position relative to the lower portion.

18. The oven of claim 17 further comprising a locking mechanism adapted to maintain the upper portion in a pivoted into position relative to the lower portion.

19. The oven of claim 18 wherein the locking mechanism includes:
a lid strap mount provided on the upper portion or the lower portion;
a lid strap connected to the lid strap mount; and
a lid strap catch provided on the upper portion or the lower portion, said lid strap catch adapted to connect to and disconnect from the lid strap.

20. The oven of claim 18 wherein the gas-powered bottom burner is an infrared burner.

21. The oven of claim 20 wherein the infrared burner includes an emitter entirely disposed between the central axis and a side wall of the housing.

22. The oven of claim 17 wherein the infrared burner includes an emitter entirely disposed between the central axis and a side wall of the housing.

23. The oven of claim 16 wherein the gas-powered bottom burner is an infrared burner.

24. The oven of claim 16 further comprising a gas-powered curved back burner disposed within the baking chamber above and behind the circular metal pan relative to the baking chamber opening.

25. The oven of claim 24 further comprising a curved heat reflector disposed within the baking chamber between the curved back burner and the circular metal pan.

26. The oven of claim 24 further comprising a single gas valve connected to both the gas-powered bottom burner and the gas-powered back burner.

27. The oven of claim 24 wherein the bottom burner is adapted to provide in the range of 8000 to 11000 BTU/hour heat output for cooking, and
    wherein the back burner is adapted to provide in the range of 10000 to 13000 BTU heat output for cooking.

\* \* \* \* \*